3,189,529
HIGH-ACTIVITY LIPASE AND METHOD OF PREPARATION THEREOF
Koichi Yamada, Tokyo, and Haruo Machida, Saitama-ken, Japan, assignors to Meito Sangyo Kabushiki Kaisha, Nishi-ku, Japan, a corporation of Japan
No Drawing. Filed Sept. 24, 1962, Ser. No. 225,908
Claims priority, application Japan, Sept. 25, 1961, 36/34,236
6 Claims. (Cl. 195—62)

This invention relates to a high-activity lipase obtained by the cultivation of *Candida cylindracea*, a new species belonging to the genus Candida, and to the method of preparing the same. More particularly, it relates to a high-activity lipase which is obtained by cultivating in a suitable medium *Candida cylindracea* having A.T.C.C. No. 14,830, a new species belonging to the genus Candida, and the variants and mutants which possess most of the distinctive properties of the parent yeast; and to the method of preparation thereof.

In 1948 Peters et al. using *Mycotorula lipolytica* observed the formation of lipase, and in 1952 Nelson likewise observed the formation of lipase by using *Deotricum candidum*. In the former case the object was to denature and ripen butter fat in the manufacture of butter, cheese, etc., while in the latter case the activity of the lipase obtained was low, and thus it was impossible to prepare a high-activity lipase using these yeasts.

When research was conducted for the purpose of obtaining a lipase having sufficiently high activity, numerous microbes from air, soil, sewage, etc., were isolated. An investigation into their products was made and a new species belonging to the genus Candida was discovered. The production of lipase in the Candida culture medium was remarkably high. Hence, an easy and low cost method of preparing a lipase of very high activity was established.

Accordingly, it is an object of the present invention to provide a high-activity lipase produced by a new yeast species and the method of preparing the same.

Another object of the invention is to provide for medicinal purposes a high-activity lipase possessing very favorable activity maintenance and preservability as well as excellent acid stability, and the method of preparation thereof.

Other objects and advantages of this invention will be apparent from the following description.

The lipase-producing yeast used in the present invention is a yeast that was isolated from the soil and is a strain belonging to a new species which we named *Candida cylindracea* nov. sp. and which has A.T.C.C. No. 14,830. Its microbiological characteristics are as follows:

(1) Cell in malt extract: After 3 days at 25° C. the cells are long-oval to cylindrical or pseudomycelical, $(0.8–3.5) \times (2.0–21)\mu$, single, in pairs, or in chains as pseudomycelium.
(2) Slide cultures on potato agar: Well developed pseudomycelium is formed.
(3) Pellicle formation: Grey, slightly rough and creeping truefilm is formed on the malt medium.
(4) Sporulation: No formation.
(5) Streak culture: Greyish-white, umbonate at the elevation, undulate at the margin, very moist, dull, wrinkled for netted form at the surface.
(6) Fermentation: Glucose+ galactose— sucrose+ (very weak) maltose— lactose— raffinose—.
(7) Sugar assimilation: Glucose+ galactose+ sucrose+ maltose+ (very weak) lactose— xylose+.
(8) $KNO_3$ assimilation: Negative.
(9) Growth in ethanol medium: A pellicle is formed.
(10) Splitting of arbutin: Negative.

The differences between this yeast, *Candida cylindracea*, and *Candida solani* and *Mycotorula lipolytica* are as shown in Table I, below. Thus, it is definite that this is a new species.

TABLE I

| | Mycotorula lipolytica | Candida solani | Candida cylindracea |
|---|---|---|---|
| Cell | $(2-4.5) \times (4-22)\mu$ | $(2-4) \times (4-13)\mu$ | $(0.8-3.5) \times (2-21)\mu$ |
| Colony | Smooth yellowish | Smooth yellowish | Wrinkled, netted greyish-white. |
| Fermentation: | | | |
| Glucose | − | + | +. |
| Sucrose | − | + (very weak) | + (very weak). |
| Sugar assimilation: | | | |
| Galactose | − | + (very weak) | +. |
| Maltose | − | + | + (very weak). |
| Sucrose | − | + | +. |
| Splitting of arbutin | Absent or slightly positive | + | −. |

The characteristics of this yeast are not restricted to those mentioned hereinabove, as it is capable of being changed artificially or naturally. Moreover, as long as they possess the ability at least of producing lipase, the variants and mutants of this yeast can also be used in the method of this invention.

Accordingly, the yeast species used in the present invention include *Candida cylindracea* and the variants and mutants thereof that possess most of the distinctive properties of the parent yeast.

The method of preparing lipase according to the present invention is described hereinafter.

The collection or preparation as used in this invention means the acquisition of lipase in a state in which it is more readily purified, or in a higher concentration or higher purity.

The composition of the medium for cultivating the yeast used in the present invention may be either a suitable natural or synthetic medium which contains at least a carbon source, nitrogen source and an inorganic substance. Any carbon source and nitrogen source may be employed as long as they can be used by *Candida cylindracea* and the variants and mutants thereof that possess most of the distinctive properties of the parent yeast. The carbon source used may be, for example, sucrose, lactose, glucose, xylose, starch etc. Similarly, as long as they are assimilable, a wide range of nitrogen sources can be used, such as inorganic ammonium salts, amino acids and a wide variety of other protein substances, etc. The inorganic salts may also include, for example, phosphates, magnesium salts, calcium salts and numerous other inorganic salts. The amounts of carbon source, nitrogen source and inorganic salts, and the composition of the medium itself will vary depending upon the adaptability of the yeast that is used for the production of lipase.

As the temperature of cultivation, an optimum temperature for growth is selected, normally 20–35° C., and preferably 25–33° C., being suitable. The pH of the medium is suitably from 5.0 to 8.0, and normally the cultivation is carried out for 1–7 days. Although the cultivation may be carried out by means of either solid or liquid culture, generally more favorable results are obtained by liquid culture. Preferably the culture is carried out under aerobic conditions. Thus, while in the case of liquid culture, surface culture may be employed, better results are obtained by means of shaking culture or submerged culture.

As a result of cultivation, as described above, high-activity lipase is produced in the medium. Collecting the high-activity lipase from the culture medium, in the case of solid culture, is accomplished by extracting with water or an aqueous solution, while in the case of liquid culture it is done by removal of the cell, whereby in both cases a high-activity lipase-containing solution can be collected. The aqueous solution may be one containing salts such as sodium chloride, potassium chloride, etc., or a solution containing acids such as hydrochloric acid, citric acid, acetic acid, etc., as well as one of the numerous buffer solutions.

The enzyme solution containing high-activity lipase can then be concentrated or solidified by carrying out a purification treatment such as precipitation with organic solvents, salting out, concentration under reduced pressure, purification by means of ion exchangers, etc. The organic solvents used in this case include the water miscible organic solvents such as methanol, ethanol, isopropanol, acetone, etc. When the foregoing solvents are used, the concentration at which the organic solvents are added is such that at 20% by volume the enzyme remains dissolved but at 60% by volume the collection of a precipitating portion will result. As the salting out agent, any of the salts that dissolve readily in water may be used, such as ammonium sulfate, sodium sulfate, magnesium sulfate, etc. The concentration at which these salts are added is, for example, in the case of ammonium sulfate, such that at 10% saturation the enzyme remains dissolved, but at 30% saturation the collection of a precipitating portion will result. Purification by means of an ion exchange resin can also be utilized.

The high-activity lipase that is provided by the present invention can remain in storage even at room temperatures over an extended period of time without any lowering of its activity, if stored after drying. The optimum pH of this enzyme is in the neighborhod of 7, and it is extremely stable between pH 5.0 and 8.5. Even at pH 3.0, it is acid stable to a considerable extent, only 45% of its activity being inactivated upon being exposed for 30 minutes to a temperature of 30° C. This property of the lipase is especially advantageous when it is used for medicinal purposes.

The high-activity lipase of the invention, which is capable of being economically and very advantageously mass-produced continuously on a commercial basis, can be utilized not only for medicinal purposes but also for other uses such as detergent use, cosmetic use, food additive use, etc.

In order to more clearly understand the present invention, examples illustrating the mode of practicing the invention are given below. It will be understood that the examples are merely intended in an illustrative sense, and the invention is not to be limited thereby, it being possible to make various changes without departing from the spirit and scope of the invention.

Example I

A 50 ml. portion of a medium whose pH is 7.2 and which contains 2% of starch, 2% of soybean flour, 0.1% of ammonium sulfate, 0.5% of potassium diphosphate and 0.1% of magnesium sulfate is poured into a shaking flask of 500 ml. capacity. The solution is sterilized for 5 minutes at 115° C., and then is inoculated with *Candida cylindracea*, after which shaking culture is carried out at 30° C. The cell is removed by centrifuge 72 hours later. When ammonium sulfate is gradually added to the supernatant and its degree of saturation is brought to 30%, the lipase in the liquid precipitates and the precipitate is collected by centrifuge. By drying under reduced pressure at room temperature, a powder of lipase is obtained. The yield is about 2% based on the volume of the medium. The activity of this powdered lipase measured by means of hydrolysing of fat is as follows:

|  | Rate of hydrolysing of fat, percent |
|---|---|
| Present powdered lipase (unpurified), 5 mg. | 26 |
| Lipase powder (purified) produced by Mann Research Laboratories, 5 mg. | 25 |

The foregoing test was performed by the following method of Nord et al. Namely, 5 ml. of an emulsion of olive oil, 3 ml. of a buffer solution and 1 ml. of the enzyme solution are incubated at 37° C. for 4 hours. The rate of hydrolysing of fat is measured by means of titration of the fatty acid with a caustic soda solution.

Example II

A 50 ml. portion of a medium whose pH is 7.2 and which contains 2% of xylose, 2% of soybean flour, 0.1% of ammonium sulfate, 0.1% of magnesium sulfate and 0.5% of potassium diphosphate is poured into a shaking flask of 500 ml. capacity. After sterilizing for 5 minutes at 115° C., the solution is inoculated with the *Candida cylindracea*, and then shaking culture is carried out at 30° C. The cell is removed by centrifuge 72 hours later. When ethanol is added gradually to the supernatant until the concentration thereof is brought to 60% by volume, all of the lipase in the liquid precipitates. This precipitate is collected and dried under reduced pressure at room temperature whereby powdered lipase is obtained. The yield of this powdered lipase is about 2% based on the volume of the medium. This powdered lipase even though stored for more than a month at room temperature does not lose its activity, which in terms of hydrolysing of fat is 25%.

Having thus described the nature of the invention, what we claim is:

1. A lipase having high-activity at a pH from 3.0–8.5 obtained by cultivating at a temperature of from 20–35° C. in a suitable medium *Candida cylindracea* A.T.C.C. No. 14,830.

2. A method of preparing high activity lipase which comprises cultivating in a suitable medium *Candida cylindracea* A.T.C.C. No. 14,830, wherein lipase is produced, and thereafter collecting the lipase from the culture.

3. The method acording to claim 2 in which said medium contains at least a carbon source, a nitrogen source and an inorganic substance.

4. The method according to claim 3 in which said medium has a pH of 4.5–8.5 and the temperature of cultivation is 20–35° C.

5. A method of preparing high-activity lipase which comprises cultivating at a temperature of 20–35° C. for 1–7 days, in a medium containing at least a carbon source, a nitrogen source, and an inorganic substance, *Candida cylindracea* A.T.C.C. No. 14,830 wherein lipase is produced, and thereafter collecting lipase from the culture obtained.

6. The method according to claim 5 wherein the lipase is collected from the culture by a step selected from the group consisting of (1) precipitating with an organic solvent, (2) salting out, (3) concentrating under reduced pressure, (4) purifying with an ion exchanger and (5) a combination of said steps.

References Cited by the Examiner

Journal of Food Science, 26 (No. 5), pp. 518–524 (1961); reprint of 195–62 lipase.

Cook: "The Chemistry and Biology of Yeasts," 1958, pp. 52, 55, Academic Press Inc., New York.

A. LOUIS MONACELL, *Primary Examiner.*

ABRAHAM H. WINKELSTEIN, *Examiner.*